2,927,924
NOVEL PHENETHYL-SUBSTITUTED PIPERAZINES

Jack Mills, Glenns Valley, Ind., assignor to Eli Lilly and Company, Indianapolis, Ind., a corporation of Indiana No Drawing. Application April 3, 1958
Serial No. 726,027
6 Claims. (Cl. 260—268)

This invention relates to novel organic compounds, and more particularly to novel substituted N-phenethyl-piperazine bases and acid addition salts thereof.

The novel phenethylpiperazine bases of this invention can be represented by the following formula:

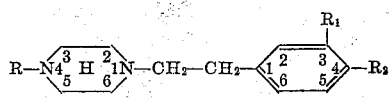

wherein R is a member of the group consisting of α-naphthyl, 2-pyridyl, 3-, 4-, and 6-monomethyl-2-pyridyl, phenyl, o- and m-monoalkylphenyl, o- and m-monoalkyloxyphenyl, and o- and m-monochlorophenyl; and $R_1$ and $R_2$ are members of the group consisting of hydrogen, hydroxy, amino, and alkyloxy, alkylamino, alkylcarbacyloxy, and alkylcarbacylamido in which the alkyl group has from 1 to 2 carbon atoms, and at least one of $R_1$ and $R_2$ is other than hydrogen.

The pharmaceutically acceptable acid addition salts of the piperazine bases represented by the above formula are also included within the scope of this invention. Among the acids which form pharmaceutically acceptable acid addition salts of the piperazine bases, are inorganic acids such as hydrochloric, hydrobromic, sulfuric, and the like acids, and organic acids such as tartaric, maleic, acetic, and the like acids.

The free piperazine bases of this invention are usually heavy viscous oils. The acid addition salts are in general white crystalline solids which melt in the range of about 200° C. The piperazine bases in having two basic nitrogens can form both mono-and di-acid addition salts. In general, the salts are somewhat soluble in the lower alcohols such as methanol and ethanol and are moderately soluble in water, but they are relatively insoluble in most other organic solvents.

The novel compounds of this invention can be prepared by one or more of the several methods which are described in general terms in the following paragraphs. In the description of the methods of preparation, R, $R_1$, and $R_2$ have the same meaning as hereinabove set forth.

The compounds of the invention can be obtained by initially preparing an R-substituted piperazine and reacting it with an $R_1R_2$-substituted phenethyl halide to yield the desired phenethylpiperazine. This synthetic method is illustrated by the following equation:

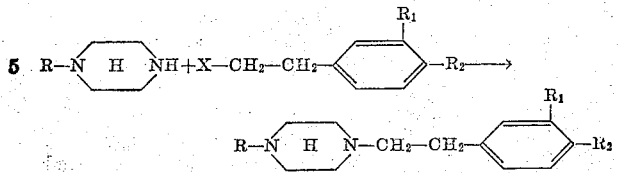

Alternatively, the R-substituted piperazine can be reacted with an $R_1R_2$-substituted phenylacetyl chloride to yield a 1-phenacetylpiperazine which is reduced with an appropriate reducing agent such as lithium aluminum hydride to yield the desired 1-phenethylpiperazine. The following equations illustrate this method:

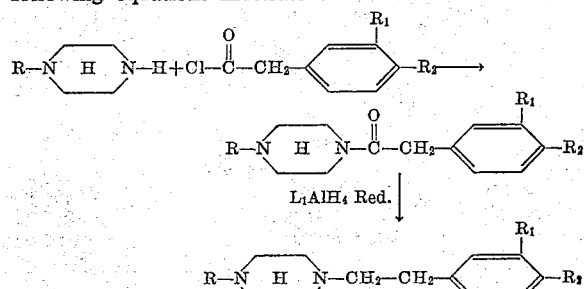

The R-substituted piperazines, when employed in the preparation of the piperazine bases of this invention, can be prepared by the procedure described by Pollard in J. Am. Chem. Soc. 56, 2199 (1934).

It is desirable in preparation of an R-substituted piperazine, when R has an alkoxy group, to follow an alternative procedure described by Prelog in Collection des Travaux Chimiques Tcheques 5, 497 (1933).

An alternative method can be employed to prepare the piperazine bases of this invention other than those in which $R_1$ or $R_2$ represents an amino group. In this method, the R-substituted alkoxyphenethylpiperazine bases are initially prepared. From the alkoxyphenethylpiperazines, the hydroxyphenethylpiperazines and alkylcarbacyloxyphenethylpiperazines can be obtained by employing standard hydrolysis and acylation procedures. The method comprises the following steps: ethylene oxide is reacted with an alkoxyphenethylamine to yield the corresponding N-diethanol alkoxyphenethylamine, the diethanolamine is reacted with thionyl chloride to yield the N-di-β-chloroethyl alkoxyphenethylamine which is reacted with sodamide and an R-substituted primary amine to yield the desired alkoxyphenethylpiperazine. The following equations illustrate the method by showing the preparation of 4-(o-tolyl)-1-homoveratrylpiperazine:

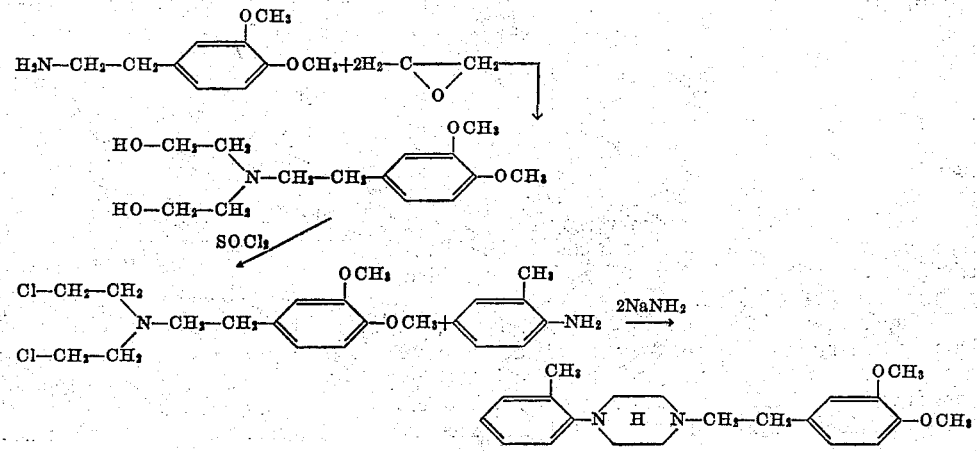

Those piperazine bases of this invention in which the phenethyl radical is substituted with an amino group can be prepared by reacting an R-substituted piperazine with a 3- or 4-nitrophenethyl halide to yield the nitrophenethylpiperazine derivative which is hydrogenated to yield the aminophenethylpiperazine. If desired, the alkylaminophenethyl and alkylcarbacylamidophenethylpiperazines can be prepared from the aminophenethylpiperazines by employing standard alkylation or acylation methods.

The acid addition salts of the piperazine bases can be provided by dissolving the free piperazine base in a suitable solvent such as ethyl ether or ethanol followed by acidification with a suitable acid. The acid addition salt crystallizes out as the mono- or di-acid addition salt depending upon their relative solubilities in the crystallizing solvent.

The compounds of this invention are active pharmacologically as hypotensive agents and as tranquilizing agents in mammals. The compounds are also useful as intermediates in the preparation of other pharmacologically active compounds. They can be administered therapeutically in the form of the free base or as a pharmaceutically acceptable acid addition salt either alone or in combination with various pharmaceutically acceptable extending media so as to provide forms commonly employed in the medical art such as tablets, filled capsules, solutions, and elixirs. It is preferred to employ an acid addition salt in the therapeutic administration of the compounds since the salts are solids and hence are more amenable to the compounding of pharmaceutical preparations. In general, single dose amounts of the compounds employed for producing a hypotensive or tranquilizing effect do not exceed about 3 mg./kg. of body weight of the treated subject. The dose range can be varied widely depending largely upon individual response, and the nature and severity of the condition for which the medication is desired.

The following specific examples further illustrate the invention.

EXAMPLE 1

*Preparation of 4-phenyl-1-homoveratrylpiperazine hydrochloride*

277 g. (6.3 mols) of ethylene oxide in 1 l. of cold ethanol are added with stirring over a thirty minute period to a solution of 543 g. (3 mols) of homoveratrylamine in 3 l. of 95 percent ethanol. During the addition, the reaction mixture is maintained at 5–10° C. by external cooling. After the reaction mixture is permitted to stand overnight at room temperature, the ethanol is removed by evaporation and the oily residue is fractionated by vacuum distillation. The desired di-β-hydroxyethylhomoveratrylamine is collected in the boiling range of 160–180° C. at a pressure of 0.1 mm. of mercury.

*Analysis.*—Calculated: N, 5.20. Found: N, 5.27. $n_D^{25}$=1.5398.

705 g. (2.6 mols) of di-β-hydroxyethylhomoveratrylamine are dissolved in 2 l. of chloroform. After the solution is saturated with hydrogen chloride gas, 708 g. (6 mols) of thionyl chloride are added to the solution with stirring at such a rate that the temperature can be maintained at 10–15° C. by external cooling. The mixture is then refluxed for three hours. On cooling the refluxed mixture, di-β-chloroethylhomoveratrylamine hydrochloride crystallizes out, is removed by filtration, and is washed with cold acetone. The product, di-β-chloroethylhomoveratrylamine hydrochloride, has a melting point of about 144–146° C.

The amine hydrochloride can be converted to the free base by treating an aqueous suspension of the salt with a slight excess of 10 percent sodium hydroxide. The base is extracted with ether, the ether solution is dried with anhydrous magnesium sulfate, and the ether is evaporated. The waxy residue is the free base of di-β-chloroethylhomoveratrylamine.

18.6 g. (0.2 mol) of aniline are added with stirring to 0.44 mol of sodamide in 800 ml. of liquid ammonia. After stirring for ten minutes, 0.2 mol of the free base of di-β-chloroethylhomoveratrylamine in 80 ml. of ether are added dropwise to the mixture with stirring. After one hour, 800 ml. of toluene are added and the liquid ammonia is removed by evaporation. The residual toluene mixture is refluxed for twelve hours. The refluxed mixture is cooled and poured into 500 ml. of water. 1 l. of ether is added. The organic layer is removed and extracted two times successively with 300 ml. portions of 10 percent hydrochloric acid. The combined acid extract containing the 4-phenyl-1-homoveratrylpiperazine hydrochloride as a viscous insoluble oil is made strongly basic by the addition of 20 percent sodium hydroxide solution. The basic aqueous mixture is extracted with a combination of 1 l. of ether and 100 ml. of chloroform. The extract is washed with water, dried with anhydrous magnesium sulfate, and evaporated to dryness. The solid residue comprising 4-phenyl-1-homoveratrylpiperazine is dissolved in 100 ml. of ethanol. The alcoholic solution is acidified by saturating it with hydrogen chloride gas. On the gradual addition of ether with stirring to the acidified alcoholic solution, 4-phenyl-1-homoveratrylpiperazine monohydrochloride crystallizes out, and is removed by filtration. After recrystallization from ethanol, the crystalline 4-phenyl-1-homoveratrylpiperazine hydrochloride melts at about 232–233° C.

*Analysis.*—Calculated: Cl, 9.77; N, 7.72. Found: Cl, 9.55; N, 7.97.

EXAMPLE 2

*Preparation of 4-(o-chlorophenyl)-1-homoveratrylpiperazine hydrochloride*

Following the procedure of Example 1, 25.4 g. (0.2 mol) of o-chloroaniline are condensed with 0.2 mol of di-β-chloroethylhomoveratrylamine to yield 4-(o-chlorophenyl)-1-homoveratrylpiperazine hydrochloride. After recrystallization from ethanol, the product consisting of 4-(o-chlorophenyl)-1-homoveratrylpiperazine hydrochloride melts at about 244–245° C.

*Analysis.*—Calculated: N, 7.05. Found: N, 6.94.

The following table lists other 1-homoveratrylpiperazines prepared by condensing the appropriate R-substituted primary amine with di-β-chloroethylhomoveratrylamine according to the procedure described in Example 1. In the column of Table I headed Elemental Analysis, the subscripts "c" and "f" refer respectively to the "calculated" and "found" analytical values.

TABLE I

| Piperazine Prepared | Melting Point | Elemental Analysis |
|---|---|---|
| 4-(m-chlorophenyl)-1-homoveratryl·HCl | 199–200° C | $N_c$ 7.05; $Cl_c$ 8.92. $N_f$ 6.93; $Cl_f$ 8.65. |
| 4-(o-methoxyphenyl)-1-homoveratryl·2HCl | 225–226° C. (dec.) | $N_c$ 6.41. $N_f$ 6.64. |
| 4-(o-ethoxyphenyl)-1-homoveratryl hydrate·HCl | 194–195° C | $C_c$ 62.41; $H_c$ 7.80. $C_f$ 62.84; $H_f$ 8.12. |
| 4-(m-methoxyphenyl)-1-homoveratryl·2HCl | 195–196° C. (dec.) | $N_c$ 6.52. $N_f$ 6.70. |
| 4-(o-tolyl)-1-homoveratryl·HCl | 260–261° C | $C_c$ 66.91; $H_c$ 7.76. $C_f$ 66.54; $H_f$ 7.82. |
| 4-(m-tolyl)-1-homoveratryl·HCl | 224–225° C | $C_c$ 66.91; $H_c$ 7.76. $C_f$ 67.43; $H_f$ 7.71. |
| 4-(o-ethylphenyl)-1-homoveratryl·2HCl | 205° C. (dec.) | $N_c$ 6.51. $N_f$ 6.46. |
| 4-(α-naphthyl)-1-homoveratryl·HCl | 275° C. (dec.) | $C_c$ 69.84; $H_c$ 7.01. $C_f$ 69.85; $H_f$ 7.12. |

EXAMPLE 3

*Preparation of 4-(2-pyridyl)-1-homoveratrylpiperazine dihydrochloride*

18.8 g. (0.2 mol) of 2-aminopyridine are added to 1 l. of dry toluene containing 19.2 g. (0.4 mol) of sodium hydride as a 50 percent dispersion. After the mixture is refluxed for three hours, it is cooled to 60° C. To the cooled mixture is added 0.2 mol of di-β-chloroethyl-homoveratrylamine. After maintaining at 60° C. for two hours, the resulting mixture is refluxed overnight. The refluxed mixture is worked up following the procedure of Example 1 to provide 4-(2-pyridyl)-1-homoveratrylpiperazine dihydrochloride. After recrystallization from ethanol, the crystalline product consisting of 4-(2-pyridyl)-1-homoveratrylpiperazine dihydrochloride melts with decomposition at about 225–226° C.

Analysis.—Calculated: N, 10.04; Cl, 16.94. Found: N, 10.00; Cl, 16.86.

The other pyridylpiperazines listed below are prepared by condensing 3-methyl-2-pyridine, 4-methyl-2-pyridine, or 6-methyl-2-pyridine with di-β-chloroethyl-homoveratrylamine according to the above procedure.

4-(3-methyl-2-pyridyl)-1-homoveratrylpiperazine dihydrochloride, melting point—206–207° C. (dec.);
4-(4-methyl-2-pyridyl)-1-homoveratrylpiperazine dihydrochloride, melting point—222–223° C. (dec.); and
4 - (6 - methyl - 2 - pyridyl) - 1 - homoveratrylpiperazine dihydrochloride, melting point—125–126° C. (dec.)

EXAMPLE 4

*Preparation of 4-phenyl-1-(3,4-dihydroxyphenethyl)-piperazine hydrobromide*

A suspension of 10 g. of 4-phenyl-1-homoveratrylpiperazine hydrochloride in 70 ml. of 48 percent hydrobromic acid is refluxed for three hours. Upon cooling and concentration of the refluxed mixture, 4-phenyl-1-(3,4-dihydroxyphenethyl)piperazine hydrobromide, crystallizes out and the crystals are removed by filtration. After recrystallization from 90 percent ethanol, the crystalline 4-phenyl - 1 - (3,4 - dihydroxyphenethyl)piperazine hydrobromide melts with decomposition at about 266° C.

EXAMPLE 5

*Preparation of 4-(m-tolyl)-1-(3,4-dihydroxyphenethyl)-piperazine dihydrobromide*

5 g. of 4-(m-tolyl)-1-homoveratrylpiperazine hydrochloride are refluxed with hydrobromic acid and the product consisting of 4-(m-tolyl)-1-(3,4-dihydroxyphenethyl)piperazine hydrobromide is isolated following the procedure described in Example 4. After recrystallization from 90 percent ethanol, the crystalline 4-(m-tolyl)-1-(3,4 - dihydroxyphenethyl)piperazine dihydrobromide melts at about 256–257° C.

Analysis.—Calculated: C, 48.12; H, 5.53. Found: C, 48.22; H, 6.16.

In the following table are listed other 1-(3,4-dihydroxyphenethyl)piperazines which are prepared from their corresponding 1-homoveratrylpiperazine compounds by cleaving with hydrobromic acid following the procedure of Example 4.

TABLE II

| Piperazine Prepared | Melting Point | Elemental Analysis |
|---|---|---|
| 4-(o-chlorophenyl)-1-(3,4-dihydroxyphenethyl)·HBr. | 208–210° C | N₀ 6.74. N₁ 6.59. |
| 4-(o-tolyl)-1-(3,4-dihydroxyphenethyl)·2HBr. | 229–230° C | C₀ 46.35; H₀ 5.73. C₁ 45.93; H₁ 6.04. |
| 4-(o-ethylphenyl)-1-(3,4-dihydroxyphenethyl)·2HBr. | 200–201° C | N₀ 5.74. N₁ 5.51. |
| 4-(2-pyridyl)-1-(3,4-dihydroxyphenethyl)·2HBr. | 254–255° C | N₀ 9.08. N₁ 9.04. |
| 4-(6-methyl-2-pyridyl)-1-(3,4-dihydroxyphenethyl)·2HBr. | 167–169° C | N₀ 8.25. N₁ 8.47. |
| 4-(4-methyl-2-pyridyl)-1-(3,4-dihydroxyphenethyl)·2HBr. | 263° C. (dec.) | Br₀ 33.56. Br₁ 33.75. |
| 4-(3-methyl-2-pyridyl)-1-(3,4-dihydroxyphenethyl)·2HBr. | 208–210° C | N₀ 8.25. N₁ 8.35. |

EXAMPLE 6

*Preparation of 4-phenyl-1-(3,4-dipropionyloxyphenethyl)-piperazine hydrobromide*

2 g. of 4-phenyl-1-(3,4-dihydroxyphenethyl)piperazine hydrobromide obtained as described in Example 4, are refluxed for two hours with 20 g. of propionic anhydride. 4-phenyl-1-(3,4-dipropionyloxyphenethyl)piperazine hydrobromide crystallizes out of the refluxed mixture upon concentration, and is removed by filtration. After recrystallization from an ethanol-ethyl acetate solvent mixture, the crystalline 4-phenyl-1-(3,4-dipropionyloxyphenethyl)piperazine hydrobromide product melts at about 186–188° C.

Analysis.—Calculated: C, 58.65; N, 6.36. Found: C, 58.10; N. 6.38.

EXAMPLE 7

*Preparation of the free base of 4-phenyl-1-(3,4-dihydroxyphenethyl)piperazine*

5 g. of the 4-phenyl-1-(3,4-dihydroxyphenethyl)-piperazine hydrobromide crystals are suspended in 10 ml. of hot ethanol. 100 ml. of water are slowly added to the ethanol solution, the resulting aqueous ethanol mixture is neutralized with a slight excess of 5 percent sodium bicarbonate solution, and the 4-phenyl-1-(3,4-dihydroxyphenethyl)piperazine base contained in the neutralized mixture is extracted with 200 ml. of chloroform. The extract is dried with anhydrous magnesium sulfate and is evaporated to dryness. The dried residue is the free base of 4-phenyl-1-(3,4-dihydroxyphenethyl)piperazine.

EXAMPLE 8

*Preparation of 4-phenyl-1-(3,4-diacetoxyphenethyl)-piperazine hydrochloride*

1 g. of the 4-phenyl-1-(3,4-dihydroxyphenethyl)-piperazine base provided as described in Example 7 is suspended in 20 ml. of acetic anhydride and the mixture is refluxed for one hour. After the excess acetic anhydride is removed by evaporation in vacuo, the refluxed mixture is neutralized with a slight excess of 5 percent sodium bicarbonate solution. To the neutralized mixture is added 100 ml. of ether, the organic phase is withdrawn and is dried with anhydrous magnesium sulfate. The ether extract is acidified by bubbling in hydrogen chloride gas causing 4-phenyl-1-(3,4-diacetoxyphenethyl)-piperazine hydrochloride to crystallize out. On recrystallization from ethanol, the crystalline 4-phenyl-1-(3,4-diacetoxyphenethyl)piperazine hydrochloride melts at about 228–229° C.

EXAMPLE 9

*Preparation of 4-(o-methoxyphenyl)-1-(3,4-dihydroxyphenethyl)piperazine hydrobromide*

3.5 g. of 4-(o-methoxyphenyl)-1-homoveratrylpiperazine dihydrochloride provided as described in Example 2, are treated following the procedure of Example 4 to produce 4 - (o - methoxyphenyl) - 1 - (3,4 - dihydroxyphenethyl)piperazine hydrobromide. After recrystallization from 90 percent ethanol, the product consisting of 4 - (o - methoxyphenyl) - 1 - (3,4 - dihydroxyphenethyl)piperazine hydrobromide melts at about 208–209° C.

Analysis.—Calculated: N, 6.84. Found: N, 6.60.

EXAMPLE 10

*Preparation of 4-(o-methoxyphenyl)-1-(3,4-diacetoxyphenethyl)piperazine hydrobromide*

2 g. of 4-(o-methoxyphenyl)-1-(3,4-dihydroxyphenethyl)piperazine hydrobromide are refluxed for two hours with 50 g. of acetic anhydride. After the excess acetic anhydride is removed from the refluxed mixture by evaporation in vacuo, 4-(o-methoxyphenyl)-1-(3,4-diacetoxyphenethyl)piperazine hydrobromide crystallizes out, and is removed by filtration. The 4-(o-methoxyphenyl)-1-(3,4-diacetoxyphenethyl)piperazine hydrobromide product after recrystallization from an ethanol-ether solvent melts at about 180–182° C.

Analysis.—Calculated: N, 5.67. Found: N, 5.51.

In the following table are listed 1-(3,4-dialkylcarbacyl-oxyphenethyl)piperazines which are prepared from their corresponding 1-(3,4-dihydroxyphenethyl)piperazines employing the appropriate acylating agent by following the procedure as described above.

TABLE III

| Acyloxy Piperazine Prepared | Melting Point | Elemental Analysis |
|---|---|---|
| 4-(o-chlorophenyl)-1-(3,4-diacetoxyphenethyl)·HBr. | 225–226° C. | $C_c$ 53.08; $H_c$ 5.26. $C_f$ 52.99; $H_f$ 5.55. |
| 4-(o chlorophenyl)-1-(3,4-dipropionyloxyphenethyl)·HBr. | 182–183° C. | $C_c$ 54.81; $H_c$ 5.75. $C_f$ 55.02; $H_f$ 5.88. |
| 4-(o-tolyl)-1-(3,4-dipropionyloxyphenethyl)·HBr. | 185–186° C. | $C_c$ 59.40; $H_c$ 6.58. $C_f$ 60.09; $H_f$ 6.86. |
| 4-(o-ethylphenyl)-1-(3,4-diacetoxyphenethyl)·HBr. | 196–197° C. | $N_c$ 4.89. $N_f$ 5.29. |
| 4-(2-pyridyl)-1-(3,4-diacetoxyphenethyl)·HBr. | 200–202° C. | $Br_c$ 17.17. $Br_f$ 17.08. |
| 4-(6-methyl-2-pyridyl)-1-(3,4-diacetoxyphenethyl·2HBr. | 252° C. (dec.). | $C_c$ 47.16; $H_c$ 5.40. $C_f$ 47.19; $H_f$ 5.18. |
| 4-(4-methyl-2-pyridyl)-1-(3,4-diacetoxyphenethyl)·2HBr. | 260–262° C. | $Br_c$ 28.52. $Br_f$ 8.41. |
| 4-(3-methyl-2-pyridyl)-1-(3,4-diacetoxyphenethyl·2HBr. | 234° C. (dec.). | $C_c$ 47.16; $H_c$ 5.40. $C_f$ 47.10; $H_f$ 5.35. |

EXAMPLE 11

Preparation of 4-phenyl-1-(3-methoxyphenethyl)-piperazine hydrochloride 25 g. of m-methoxyphenylacetic acid are dissolved in 200 ml. of chloroform containing one drop of pyridine. 0.19 mol of thionyl chloride is added dropwise with stirring over a thirty minute period, while maintaining the reaction mixture temperature in the range of 25° C. by external cooling. The reaction mixture is refluxed for three hours. The refluxed mixture is evaporated to dryness. The residue comprising m-methoxyphenylacetyl chloride is dissolved in 200 ml. of dry benzene and the benzene is removed by evaporation in vacuo; this is repeated three times to rid the residue of the excess thionyl chloride.

The residue freed of thionyl chloride and consisting of m-methoxyphenylacetyl chloride is dissolved in 200 ml. of benzene and the benzene solution is slowly added with stirring to 0.35 mol of phenylpiperazine in 200 ml. of benzene. After the reaction mixture is stirred for eighteen hours at room temperature, the precipitate formed is filtered out and discarded. The filtrate is extracted three times with 200 ml. portions of 5 percent acetic acid to remove any unreacted phenylpiperazine, is washed twice with 100 ml. volumes of water, is dried with anhydrous magnesium sulfate, and is evaporated to dryness to yield a crystalline residue consisting of 4-phenyl-1-[β-(3-methoxyphenyl) - α - ketoethyl]piperazine which melts at about 74–75° C.

0.17 mol of 4-phenyl-1-[β-(3-methoxyphenyl)-α-ketoethyl]piperazine is dissolved in about 300 ml. of dry benzene and the benzene solution is added dropwise during a period of thirty minutes to a slurry of 0.3 mol of lithium aluminum hydride in 500 ml. of dry ether. The reaction mixture is refluxed for eighteen hours. To the refluxed mixture, the following successive additions are made with stirring: 12 ml. of water, 10 ml. of 20 percent sodium hydroxide, and 48 ml. of water. A precipitate forms which is removed by filtration, is washed twice with 250 ml. of ether, and the washed precipitate is discarded. The ether washes are added to the filtrate and the resulting combination is extracted twice successively with 200 ml. volumes of 10 percent hydrochloric acid. The combined acid extract is basidified by the addition of 50 percent sodium hydroxide. The alkaline aqueous solution is extracted with a combination of 1 l. of ether and 100 ml. of chloroform. The organic extract is washed twice with 100 ml. of water, is dried with anhydrous magnesium sulfate, and the solvent is removed by evaporation in vacuo leaving an oily residue which consists of the free base of 4-phenyl-1-(3-methoxyphenethyl)piperazine.

A solution of 4 g. of the free base of 4-phenyl-1-(3-methoxyphenethyl)piperazine in 200 ml. of ethanol is saturated with dry hydrogen chloride gas. The acid ethanol solution is evaporated to dryness. The dried residue consists of the hydrochloride of 4-phenyl-1-(3-methoxyphenethyl)piperazine. After recrystallization from ethanol, the 4-phenyl-1-(3-methoxyphenethyl)piperazine hydrochloride melts at about 203–205° C.

Analysis.—Calculated: N, 7.58. Found: N, 7.79.

EXAMPLE 12

Preparation of N-(o-chlorophenyl)piperazine

A stirred mixture of 127.5 g. (1 mol) of o-chloroaniline and 105 g. (1 mol) of diethanolamine is acidified by bubbling in hydrogen chloride gas gradually so as to increase slowly the temperature of the reaction mixture to 200° C. at its completion. The mixture is then heated at 240° C. and maintained at this temperature for two hours to remove the excess hydrogen chloride. The hot mixture is poured into 2 l. of water, is made strongly basic with 20 percent sodium hydroxide, and is cooled. 1 l. of ether is added to the cooled mixture. The organic phase is removed, is dried with anhydrous magnesium sulfate, and the ether is evaporated off leaving an oily residue containing N-(o-chlorophenyl)piperazine. The oily residue is fractionally distilled. The desired N-(o-chlorophenyl)piperazine is collected in the boiling range of 80–110° C. at a pressure of 0.5 mm. of mercury.

Anaysis.—Calculated: N, 14.25. Found: N, 14.06. $n_D^{25}$=1.5808.

By following the above procedure and employing the appropriate aniline, the following N-arylpiperazines are obtained:

N-(o-methylphenyl)piperazine; boiling point—110–120° C./0.5 mm. mercury; $n_D^{25}$=1.5624; analysis—calculated: N, 15.90—found: N, 15.57.

N-(m-methylphenyl)piperazine; boiling point—100–120° C./0.5 mm. mercury; $n_D^{25}$=1.5787; analysis—calculated: N, 15.90—found: N, 15.66.

N-(m-chlorophenyl)piperazine; boiling point—90–120° C./0.1 mm. mercury; $n_D^{25}$=1.5981; analysis—calculated: N, 14.25—found: N, 14.19.

EXAMPLE 13

Preparation of 4-(o-methoxyphenyl)-1-(4-methoxyphenethyl)-piperazine hydrochloride 15 g. of 4-methoxyphenethyl bromide and 30 g. of N-(o-methoxyphenyl)piperazine are thoroughly mixed and the mixture is heated on the steam bath for forty-eight hours. The reaction mixture is dissolved in 100 ml. of chloroform and made strongly alkaline with 10 percent sodium hydroxide. 500 ml. of ether are added to the alkaline mixture, and the organic layer containing 4-(o-methoxyphenyl) - 1 - (4-methoxyphenethyl)piperazine is withdrawn, dried with anhydrous magnesium sulfate, and evaporated to dryness. The oily residue is heated at a temperature of 150° C. and a pressure of 0.1 mm. to distill off unreacted N-(o-methoxyphenyl)piperazine. The remaining residue containing 4-(o-methoxyphenyl)-1-(4-methoxyphenethyl)piperazine is dissolved in 50 ml. of ethanol. On saturating the ethanol solution with hydrogen chloride gas, the hydrochloride of 4-(o-methoxyphenyl) - 1 - (4-methoxyphenethyl)piperazine crystallizes out. After recrystallization from an ethanol-ether solvent mixture, the crystalline 4-(o-methoxyphenyl)-1-(4 - methoxyphenethyl)piperazine hydrochloride melts with decomposition at about 216–218° C.

Analysis.—Calculated: N, 7.71. Found: N, 7.35.

By following the above procedure, the appropriate N-aryl-piperazines are condensed with 4-methoxyphenethyl bromide to yield the piperazines shown in the table below.

TABLE IV

| Piperazine Prepared | Melting Point | Elemental Analysis |
|---|---|---|
| 4-phenyl-1-(4-methoxyphenethyl)·HCl. | 273–274° C | $N_c$ 7.58.<br>$N_f$ 7.47. |
| 4-(o-chlorophenyl)-1-(4-methoxyphenethyl)·HCl. | 247–249° C | $N_c$ 7.62; $Cl_c$ 9.65.<br>$N_f$ 7.91; $Cl_f$ 9.68. |
| 4-(o-tolyl)-1-(4-methoxyphenethyl)·HCl. | 272–273° C | $N_c$ 8.07.<br>$N_f$ 7.90. |
| 4-(m-chlorophenyl)-1-(4-methoxyphenethyl)·HCl. | 174–175° C | $C_c$ 62.12; $H_c$ 6.58.<br>$C_f$ 62.00; $H_f$ 6.30. |
| 4-(m-tolyl)-1-(4-methoxyphenethyl)·2HCl. | 210° C. (dec.) | $N_c$ 7.31.<br>$N_f$ 7.72. |
| 4-(2-pyridyl)-1-(4-methoxyphenethyl)·free base. | 92–94° C | $N_c$ 14.08.<br>$N_f$ 14.90. |

EXAMPLE 14

*Preparation of 4-(o-methoxyphenyl)-1-(4-hydroxyphenethyl)piperazine dihydrobromide*

10 g. of 4-(o-methoxyphenyl)-1-(4-methoxyphenethyl)piperazine hydrochloride provided as described by Example 13 are refluxed for two hours with 50 g. of 48 percent hydrobromic acid. On cooling the refluxed mixture, 4-(o-methoxyphenyl)-1-(4-hydroxyphenethyl)piperazine dihydrobromide crystallizes out. After recrystallization from 90 percent ethanol-ether, the crystalline 4-(o-methoxyphenyl)-1-(4-hydroxyphenethyl)piperazine dihydrobromide melts at about 233–234° C.

*Analysis.*—Calculated: C, 48.14; H, 5.53. Found: C, 47.99; H, 6.13.

The piperazines listed in the following table are prepared according to the procedure described above employing the appropriate methoxyphenethylpiperazine.

TABLE V

| Piperazine Prepared | Melting Point, °C. | Elemental Analysis |
|---|---|---|
| 4-phenyl-1-(3-hydroxyphenethyl)·2HBr. | >275 | $N_c$ 6.31.<br>$N_f$ 6.23. |
| 4-phenyl-1-(4-hydroxyphenethyl)·HBr. | 259–260 | $N_c$ 7.72.<br>$N_f$ 7.48. |
| 4-(o-chlorophenyl)-1-(4-hydroxyphenethyl)·HBr. | 208–209 | $N_c$ 7.04.<br>$N_f$ 7.15. |
| 4-(o-tolyl)-1-(4-hydroxyphenethyl)·2HBr. | 256–257 | $N_c$ 8.07.<br>$N_f$ 7.90. |
| 4-(m-tolyl)-1-(4-hydroxyphenethyl)·2HBr. | 222–224 | $N_c$ 6.11.<br>$N_f$ 6.30. |
| 4-(m-chlorophenyl)-1-(4-hydroxyphenethyl)·HBr. | 204–205 | $C_c$ 54.35; $H_c$ 5.57.<br>$C_f$ 53.46; $H_f$ 5.68. |
| 4-(2-pyridyl)-1-(4-hydroxyphenethyl)·2HBr. | 250–252 | $N_c$ 9.41.<br>$N_f$ 9.45. |

EXAMPLE 15

*Preparation of 4-(o-methoxyphenyl)-1-(4-acetoxphenethyl)piperazine hydrobromide*

2 g. of 4-(o-methoxyphenyl)-1-(4-hydroxyphenethyl)piperazine dihydrobromide as provided by Example 14 are refluxed with 20 ml. of acetic anhydride for two hours. On removal of the excess acetic anhydride from the refluxed mixture by evaporation in vacuo, a white crystalline solid of 4-(o-methoxyphenyl)-1-(4-acetoxyphenethyl)piperazine hydrobromide crystallizes out and is removed by filtration. After recrystallization from ethanol, the crystalline 4-(o-methoxyphenyl)-1-(4-acetoxyphenethyl)piperazine hydrobromide melts at about 226–227° C.

*Analysis.*—Calculated: C, 57.90; H, 6.21. Found: C, 57.27; H, 6.23.

EXAMPLE 16

*Preparation of 4-phenyl-1-(4-acetoxyphenethyl)piperazine dihydrochloride*

2 g. of 4-phenyl-1-(4-hydroxyphenethyl)piperazine are refluxed with 20 ml. of acetic anhydride for two hours. The excess acetic anhydride is removed from the refluxed mixture by evaporation in vacuo. The residue is dissolved in 150 ml. of ethanol and the ethanol solution is acidified by saturation with hydrogen chloride gas. The dihydrochloride of 4-phenyl-1-(4-acetoxyphenethyl)piperazine crystallizes out and is removed by filtration. On recrystallization from ethanol, the crystalline 4-phenyl-1-(4-acetoxyphenethyl)piperazine dihydrochloride melts at about 220–222° C.

*Analysis.*—Calculated: N, 7.08. Found: N, 6.80.

By following the above-described procedure the alkylcarbacyloxyphenethylpiperazines listed in the table below are prepared by acylating the appropriate hydroxyphenethylpiperazines.

TABLE VI

| Piperazine Prepared | Melting Point, °C. | Elemental Analysis |
|---|---|---|
| 4-(o-methoxyphenyl)-1-(4-propionyloxyphenethyl)·HBr. | 215–216 | $C_c$ 58.84; $H_c$ 6.46.<br>$C_f$ 58.54; $H_f$ 6.64. |
| 4-phenyl-1-(3-acetoxyphenethyl)·2HBr. | 234–235 | $N_c$ 5.76.<br>$N_f$ 5.92. |
| 4-phenyl-1-(3-propionyloxyphenethyl)·2HCl. | 198–199 | $N_c$ 6.81.<br>$N_f$ 6.93. |
| 4-phenyl-1-(4-propionyloxyphenethyl)·HBr. | 197–198 | $N_c$ 6.68.<br>$N_f$ 6.62. |
| 4-(o-chlorophenyl)-1-(4-acetoxyphenethyl)·HBr. | 233–234 | $C_c$ 54.62; $H_c$ 5.27.<br>$C_f$ 55.42; $H_f$ 5.52. |
| 4-(o-chlorophenyl)-1-(4-propionyloxyphenethyl)·HBr. | 223–224 | $C_c$ 55.57; $H_c$ 5.55.<br>$C_f$ 55.94; $H_f$ 5.87. |
| 4-(o-tolyl)-1-(4-acetoxyphenethyl)·HCl. | 259–260 | $N_c$ 7.47.<br>$N_f$ 7.42. |
| 4-(o-tolyl)-1-(4-propionyloxyphenethyl)·HBr. | 254–255 | $C_c$ 60.97; $H_c$ 6.74.<br>$C_f$ 61.21; $H_f$ 7.04. |
| 4-(m-tolyl)-1-(4-acetoxyphenethyl)·HBr. | 185–186 | $C_c$ 60.14; $H_c$ 6.49.<br>$C_f$ 60.08; $H_f$ 6.98. |
| 4-(m-tolyl)-1-(4-propionyloxyphenethyl)·HBr. | 225–226 | $C_c$ 60.97; $H_c$ 6.74.<br>$C_f$ 60.75; $H_f$ 7.03. |
| 4-(2-pyridyl)-1-(4-acetoxyphenethyl)·2HBr. | 228–230 | $Br_c$ 32.80.<br>$Br_f$ 32.54. |

EXAMPLE 17

*Preparation of 4-phenyl-1-(3-methoxy-4-hydroxyphenethyl)piperazine hydrate hydrochloride*

108.8 g. (0.4 mol) of 3-methoxy-4-benzyloxyphenylacetic acid dissolved in 500 ml. of dried benzene are added with stirring to a slurry of 15.2 g. of lithium aluminum hydride and 1 l. of dried ether. The mixture is stirred and refluxed for three hours. The refluxed mixture is cooled in an ice bath and the following successive additions are made with stirring: 16 ml. of water, 16 ml. of 15 percent sodium hydroxide, and 50 ml. of water. After stirring the alkaline mixture for thirty minutes in an ice bath, the precipitate which forms is removed by filtration and is washed with 500 ml. of hot benzene. The benzene wash is combined with the alkaline filtrate. The combined alkaline filtrate is washed successively with 200 ml. of 10 percent hydrochloric acid, 200 ml. of 10 percent sodium hydroxide, and 400 ml. of water. The washed filtrate is dried with anhydrous magnesium sulfate and evaporated to dryness. The dry residue consists of 3-methoxy-4-benzyloxy-phenethanol. On crystallization from petroleum ether, the crystalline 3-methoxy-4-benzyloxyphenethanol melts at about 70–72° C.

*Analysis.*—Calculated: C, 74.39; H, 7.02. Found: C, 74.32; H, 6.92.

90 g. (0.35 mol) of 3-methoxy-4-benzyloxyphenethanol are added to a solvent consisting of 450 ml. of chloroform and 30 g. of pyridine. The mixture is cooled to 5° C. and 46 g. (0.38 mol) of thionyl chloride are added dropwise to the cooled mixture with stirring and maintaining the reaction mixture at a temperature between 0 and 5° C. After the thionyl chloride addition, the reaction mixture is heated to and maintained at a temperature in the range of 40–50° C. for two hours. The mixture is cooled and poured into 250 ml. of water. After 2.5 l. of ether are added to the aqueous mixture, the organic phase is withdrawn and is washed successively with 50 ml. of 10 percent hydrochloric acid, with 100 ml. of water, with 200 ml. of 5 percent sodium bicarbonate solution, and two times with 100 ml. of water. After drying the washed extract with anhydrous magnesium sulfate, the extract is evaporated to dryness leaving an oily residue consisting of 3-methoxy-4-benzyloxyphenethyl chloride.

10 g. of 3-methoxy-4-benzoxyphenethyl chloride are thoroughly mixed with 20 g. of N-phenylpiperazine and heated on the steam bath for forty-eight hours. The reaction mixture is dissolved in 50 ml. of chloroform and the chloroform mixture is made strongly alkaline with 10 percent sodium hydroxide. 700 ml. of ether are added. The organic phase is removed, is dried with anhydrous magnesium sulfate, and the solvent is removed by evaporation in vacuo. The residue is distilled at a temperature of 150° C. and at a pressure of 0.1 mm. of mercury to remove excess N-phenylpiperazine. The remaining residue consisting of 4-phenyl-1-(3-methoxy-4-benzyloxyphenethyl)piperazine is dissolved in 200 ml. of ether. On saturation of the ether solution with hydrogen chloride gas, 4-phenyl-1-(3-methoxy-4-benzyloxyphenethyl)piperazine hydrochloride crystallizes out and is removed by filtration. After recrystallization from ethanol, the crystalline 4-phenyl-1-(3-methoxy-4-benzyloxyphenethyl)piperazine hydrochloride melts at about 229–230° C.

7 g. of 4-phenyl-1-(3-methoxy-4-benzyloxyphenethyl)piperazine hydrochloride are dissolved in 150 ml. of 90 percent ethanol. To the ethanol solution is added a slurry of 2 g. of palladium on carbon in 50 ml. of ethanol which has been previously saturated with hydrogen. The mixture is shaken at 40 pounds of hydrogen pressure until the theoretical amount of hydrogen is consumed to convert the 4-benzyloxy group to a 4-hydroxy group. The catalyst is removed from the mixture by filtration and the filtrate is concentrated by evaporation causing 4-phenyl-1-(3-methoxy-4-hydroxyphenethyl)piperazine hydrate hydrochloride to crystallize out. After trituration with acetone, the 4-phenyl-1-(3-methoxy-4-hydroxyphenethyl)piperazine hydrate hydrochloride melts at about 135–136° C.

Analysis.—Calculated: C, 62.88; H, 7.50. Found: C, 63.18; H, 7.12.

Following the above described procedure, the following hydroxyphenethylpiperazines are prepared by condensation of 3-methoxy-4-benzyloxyphenethyl chloride with the appropriate R-substituted piperazine:

4 - (o - methoxyphenyl) - 1-(3-methoxy-4-hydroxyphenethyl)piperazine hydrochloride; melting point—234–235° C.; analysis—calculated: N, 6.74—found: N, 7.02

4 - (m-tolyl)-1-(3-methoxy-4-hydroxyphenethyl)piperazine hydrate hydrochloride; melting point—197–198° C.; analysis—calculated: N, 7.32—found: N, 705

EXAMPLE 18

*Preparation of 4-phenyl-1-(3-methoxy-4-acetoxyphenethyl)piperazine hydrochloride*

1 g. of 4-phenyl-1-(3-methoxy-4-hydroxyphenethyl)piperazine hydrate hydrochloride provided as described in Example 17 is refluxed with 20 ml. of acetic anhydride for two hours. The excess acetic anhydride is removed by evaporation in vacuo from the refluxed mixture. The dried residue consisting of 4-phenyl-1-(3-methoxy-4-acetoxyphenethyl)piperazine hydrochloride is crystallized from an ethanol-ether solvent. The thus provided crystalline 4-phenyl-1-(3-methoxy-4-acetoxyphenethyl)piperazine hydrochloride melts at about 234–235° C.

Analysis.—Calculated: C, 64.52; H, 6.96. Found: C, 64.70; H, 7.16.

EXAMPLE 19

*Preparation of 4-phenyl-1-(3-methoxy-4-propionyloxyphenethyl)piperazine hydrochloride hemihydrate*

1 g. of 4-phenyl-1-(3-methoxy-4-hydroxyphenethyl)piperazine hydrate hydrochloride is reacted with 25 ml. of propionic anhydride and the product is isolated in the manner described in Example 18 to provide crystalline 4 - phenyl-1-(3-methoxy-4-propionyloxyphenethyl)piperazine hydrochloride hemihydrate melting at about 209–210° C.

Analysis.—Calculated: C, 63.97; H, 7.26. Found: C, 63.74; H, 706.

EXAMPLE 20

*Preparation of 4-(o-methoxyphenyl)-1-(3-methoxy-4-acetoxyphenethyl)piperazine dihydrochloride*

1.5 g. of 4-(o-methoxyphenyl)-1-(3-methoxy-4-hydroxyphenethyl)piperazine hydrate hydrochloride are acetylated with 30 ml. of acetic anhydride and the product consisting of 4-(o-methoxyphenyl)-1-(3-methoxy-4-acetoxyphenethyl)piperazine dihydrochloride is isolated following the procedure described in Example 18. On recrystallization, the crystalline 4-(o-methoxyphenyl)-1-(3-methoxy-4-acetoxyphenethyl)piperazine dihydrochloride melts with decomposition at about 225° C.

The following additional 1-(3-methoxy-4-alkylcarbacyloxyphenethyl)piperazines are prepared by acylation of the appropriate 4-hydroxyphenethylpiperazine in the manner described in Example 18:

4 - (m - tolyl) - 1 - (3 - methoxy - 4 - acetoxyphenethyl) piperazine hydrochloride; melting point—209–210° C.; analysis—calculated: N, 6.92—found: N, 6.85

4 - (m - tolyl) - 1 - (3 - methoxy - 4 - propionyloxyphenethyl) piperazine hydrochloride hemihydrate; melting point—188–189° C.; analysis—calculated: C, 64.48 H, 7.45—found: C, 64.33; H, 7.57

EXAMPLE 21

*Preparation of 4-(o-methoxyphenyl)-1-(4-aminophenethyl)piperazine hydrochloride*

22 g. of N-(o-methoxyphenyl)piperazine and 11 g. of p-nitrophenethyl bromide were thoroughly mixed and heated on the steam cone for twenty-four hours. The reaction mixture is dissolved in 50 ml. of chloroform and the chloroform mixture is made strongly alkaline with 10 percent sodium hydroxide. 1 l. of ether is added. The organic phase is removed, is dried with anhydrous magnesium sulfate, and the solvent is removed by evaporation in vacuo. The residue consisting of 4-(o-methoxyphenyl) - 1 - (4 - nitrophenethyl)piperazine is crystallized from a benzene-petroleum ether solvent combination. The crystalline 4-(o-methoxyphenyl)-1-(4-nitrophenethyl)piperazine melts at about 82–83° C.

13 g. of 4-(o-methoxyphenyl)-1-(4-nitrophenethyl)piperazine are added to 180 ml. of ethanol containing 2 g. of palladium on carbon and the mixture is shaken in a hydrogen atmosphere at a pressure of 40 pounds to reduce the nitrophenethylpiperazine to the aminophenethylpiperazine, 4 - (o - methoxyphenyl) - 1 - (4 - aminophenethyl)piperazine. The catalyst is removed from the reaction mixture by filtration and the filtrate is evaporated to dryness. The dried residue is 4-(o-methoxyphenyl)-1-(4-aminophenethyl)piperazine.

3 g. of 4-(o-methoxyphenyl)-1-(4-aminophenethyl)piperazine are dissolved in ether. The ether solution is saturated with hydrogen chloride gas causing the 4-(o-methoxyphenyl) - 1 - (4 - aminophenethyl)piperazine hydrochloride to crystallize out. The crystals are removed by filtration and after recrystallization from 95 percent ethanol, the crystalline 4-(o-methoxyphenyl)-1-(4-aminophenethyl)piperazine hydrochloride melts at about 260–261° C.

EXAMPLE 22

*Preparation of 4 - (o - methoxyphenyl) - 1 - (4 - acetamidophenethyl)piperazine hydrochloride*

2 g. of 4-(o-methoxyphenyl)-1-(4-aminophenethyl)piperazine base provided as described in Example 21 are dissolved in 30 ml. of dry benzene. 3 g. of acetyl chloride are added dropwise with stirring and the mixture is refluxed for one hour. On cooling the refluxed mixture, a precipitate consisting of 4-(o-methoxyphenyl)-1-(4-acetamidophenethyl)piperazine hydrochloride appears which is removed by filtration. The precipitate is crystallized from ethanol providing a crystalline 4-(o-methoxyphenyl) - 1 - (4 - acetamidophenethyl)piperazine hydrochloride melting at about 276° C.

*Analysis.*—Calculated: N, 10.78. Found: N, 10.67.

Following the above described procedure, 4-(o-methoxyphenyl) - 1 - (4 - propionylamidophenethyl)piperazine hydrochloride melting with decomposition at about 225° C. is provided by acrylation of 4-(o-methoxyphenyl)-1-(4-aminophenethyl)piperazine with propionyl chloride.

*Analysis.*—Calculated: N, 9.54. Found: N, 10.47.

EXAMPLE 23

*Preparation of 4 - (o - methoxyphenyl) - 1 - (4 - ethylaminophenethyl)piperazine hydrochloride*

1.5 g. of 4-(o-methoxyphenyl)-1-(4-acetamidophenethyl)piperazine hydrochloride provided as described in Example 22 are dissolved in 25 ml. of water. The aqueous solution is made basic by the addition of a 5 percent sodium bicarbonate solution. The basic aqueous solution is extracted with 100 ml. of ether and the ether extract is dried with an hydrous magnesium sulfate. The ether extract containing the free base of 4-(o-methoxyphenyl)-1-(4-acetamidophenethyl)piperazine is added dropwise to 200 ml. of dry ether containing 0.76 g. of lithium aluminum hydride. The mixture is stirred overnight after which the following additions are made successively with stirring: 0.6 ml. of water, 0.8 ml. of 20 percent sodium hydroxide, and 2.8 ml. of water. A precipitate appears in the resulting mixture which is removed by filtration and discarded. On saturating the ether filtrate with hydrogen chloride gas, 4-(o-methoxyphenyl)-1-(4-ethylaminophenethyl)piperazine hydrochloride crystallizes out. After recrystallization from an ethanol-ether solvent mixture, the crystalline 4-(o-methoxyphenyl)-1-(4-ethylaminophenethyl)piperazine hydrochloride melts with decomposition at about 218–219° C.

EXAMPLE 24

*Preparation of 4 - (o - methoxyphenyl) - 1 - (4 - dimethylaminophenethyl)piperazine dihydrochloride*

2 g. of 4-(o-methoxyphenyl)-1-(4-aminophenethyl)piperazine prepared as described in Example 21 are added to 180 ml. of ethanol containing 15 g. of 37 percent formaldehyde and 0.2 g. of palladium oxide. The mixture containing the intermediate 4-(o-methoxyphenyl)-1-(4-diformylaminophenethyl)piperazine is shaken in a hydrogen atmosphere at a pressure of 40 pounds to reduce the diformylamino group to a dimethylamino group thus providing the desired 4-(o-methoxyphenyl)-1-(4-dimethylaminophenethyl)piperazine. The catalyst is removed from the reaction mixture by filtration. The filtrate is acidified by bubbling in hydrogen chloride gas. The acidified filtrate is evaporated to dryness. The residue consisting of 4-(o-methoxyphenyl)-1-(4-dimethylaminophenethyl)piperazine dihydrochloride is dissolved and crystallized from an ethanol-ether solvent combination yielding crystalline 4-(o-methoxyphenyl)-1-(4-dimethylaminophenethyl)piperazine dihydrochloride melting at about 256–257° C.

EXAMPLE 25

*Preparation of 4 - (m - tolyl) - 1 - (4 - aminophenethyl) piperazine dihydrochloride*

Following the procedure described in Example 21, 15 g. of N-(m-tolyl)piperazine and 7 g. of 4-nitrophenethyl bromide are employed in providing 4-(m-tolyl)-1-(4-aminophenethyl)piperazine dihydrochloride which after recrystallization from ethanol melts at about 286–287° C.

*Analysis.*—Calculated: C, 61.95; H, 7.39. Found: C, 61.77; H, 7.44.

EXAMPLE 26

*Preparation of 4 - phenyl - 1 - (4 - aminophenethyl)piperazine dihydrochloride*

7 g. of 4-aminophenethyl bromide and 15 g. of N-phenylpiperazine are heated on a steam cone for twenty-four hours. After cooling, 50 ml. of chloroform are added to the refluxed reaction mixture. The resulting chloroform mixture is made basic with 10 percent sodium hydroxide, 500 ml. of ether are added, and the organic phase is removed and dried with anhydrous magnesium sulfate. The dried organic extract is evaporated to dryness and the residue is distilled by heating it to 150° C. at a pressure of 1 mm. of mercury to remove excess N-phenylpiperazine. The remaining residue consisting of the free base 4-phenyl-1-(4-aminophenethyl)piperazine is dissolved in 200 ml. of ether from which the dihydrochloride of 4 - phenyl - 1 - (4 - aminophenethyl)piperazine crystallizes following saturation with hydrogen chloride gas. After recrystallization from an ethanol-ether solvent combination, the crystalline 4-phenyl-1-(4-aminophenethyl)piperazine dihydrochloride melts at about 272–273° C.

*Analysis.*—Calculated: C, 61.01; H, 7.11. Found: C, 60.73; H, 7.26.

Following the above procedure, 4-(o-chlorophenyl)-1-(4-aminophenethyl)piperazine dihydrochloride is prepared by condensing N-(o-chlorophenyl)piperazine with 4-aminophenethyl bromide. The dihydrochloride of 4-(o-chlorophenyl) - 1 - (4 - aminophenethyl)piperazine after recrystallization from ethanol melts with decomposition at about 306° C.

*Analysis.*—Calculated: N, 10.81; Cl, 18.24. Found: N, 10.68; Cl, 18.11.

I claim:

1. A compound selected from the group consisting of a base and its pharmaceutically acceptable acid addition salts, said base being represented by the following formula:

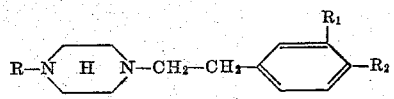

wherein R is a member of the group consisting of α-naphthyl, 2-pyridyl, 3-, 4-, and 6-monomethyl-2-pyridyl, phenyl, o- and m-monoalkylphenyl, o- and m-monoalkyloxyphenyl, and o- and m-monochlorophenyl; and $R_1$ and $R_2$ are members of the group consisting of hydrogen, hydroxy, amino, and alkyloxy, alkylamino, alkylcarbacyloxy, and alkylcarbacylamido in which the alkyl groups have from 1 to 2 carbon atoms, at least one of $R_1$ and $R_2$ being other than hydrogen.

2. 4-(o-chlorophenyl)-1-homoveratrylpiperazine.
3. 4-(m-tolyl)-1-(3,4-dihydroxyphenethyl)piperazine.
4. 4 - (o - methoxyphenyl) - 1 - (4 - acetamidophenethyl)piperazine.
5. 4 - (o - methoxyphenyl) - 1 - (3 - methoxy - 4-acetoxyphenethyl)piperazine.
6. 4-phenyl-1-(4-acetoxyphenethyl)piperazine.

References Cited in the file of this patent

Hampton et al.: Jour. Amer. Chem. Soc., vol. 59, pp. 2570–2572 (1937).